Patented May 20, 1941

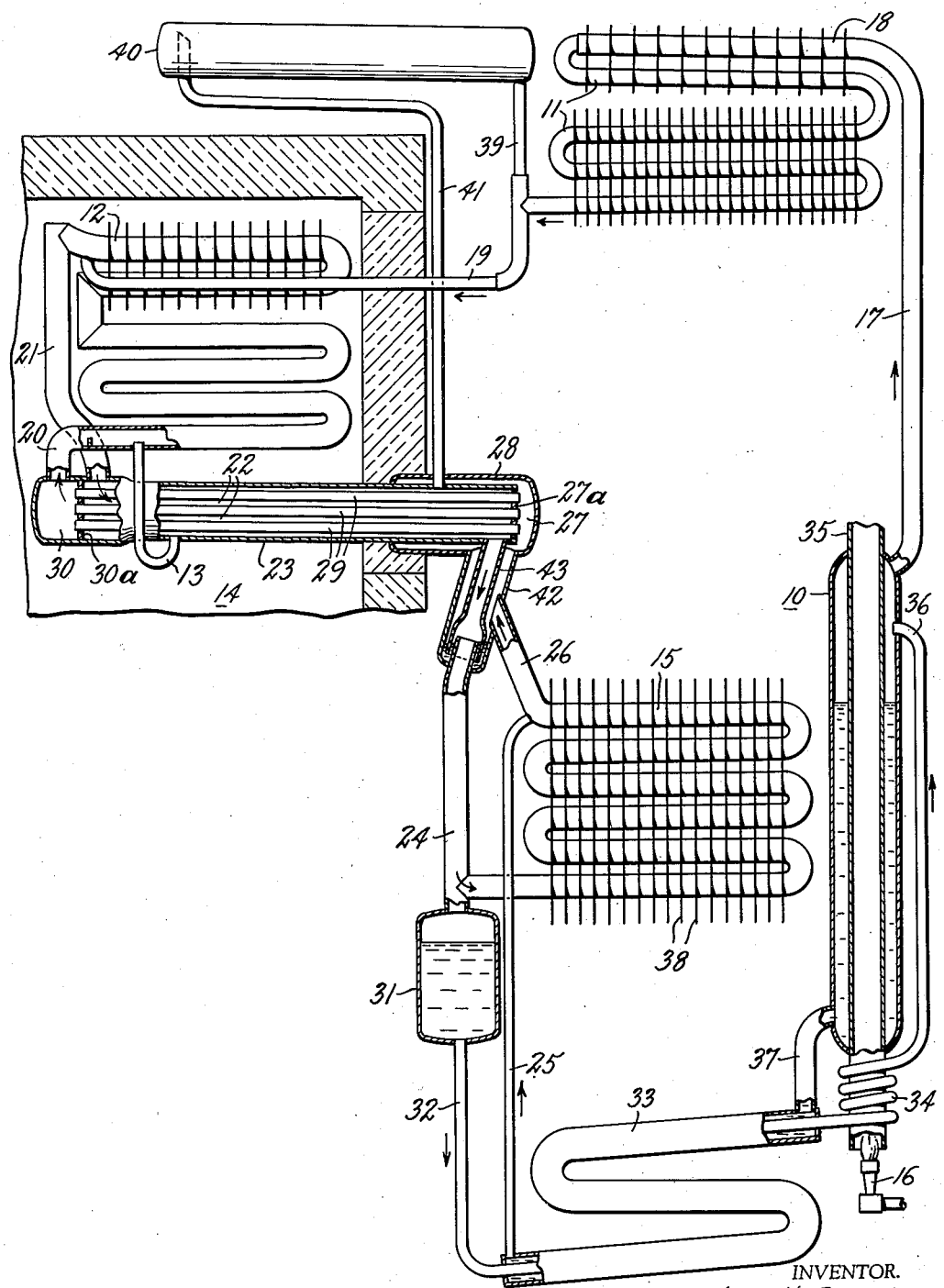

2,242,282

UNITED STATES PATENT OFFICE 2,242,282

REFRIGERATION

Harry K. Bergholm, Stockholm, Sweden, assignor, by mesne assignments, to Servel, Inc., New York, N. Y., a corporation of Delaware Application April 15, 1940, Serial No. 329,637
In Germany June 21, 1939

8 Claims. (Cl. 62—119.5)

This invention relates to refrigeration, and more particularly to a refrigeration system employing evaporation of refrigerant fluid in the presence of an inert gas or pressure equalizing agent.

In refrigeration systems of this type a circuit for circulation of inert gas or auxiliary agent is provided which includes an evaporator or cooling element, an absorber, and a gas heat exchanger which may be of a horizontal type. Refrigerant fluid evaporates and diffuses into inert gas in the cooling element to produce a refrigerating effect, and gas rich in refrigerant flows from the cooling element through one passage in the gas heat exchanger, and then to the absorber. Absorption liquid in the absorber absorbs refrigerant vapor from the inert gas, and gas weak in refrigerant flows from the absorber through another passage in the gas heat exchanger and then to the evaporator. The inert gas weak in refrigerant and leaving the absorber may contain vapor of absorption liquid. When relatively warm weak gas is cooled in the gas heat exchanger by the relatively cool rich gas, condensate is formed in the weak gas passage of the gas heat exchanger.

It is an object of the invention to provide an improvement in a refrigeration system of the type just described, and having a horizontally inclined gas heat exchanger, for removing condensate from the latter. This is accomplished by providing a pocket or auxiliary chamber which extends downwardly from the lower end of the weak gas passage of the gas heat exchanger and within which is a sleeve through which rich gas flows to the absorber. Weak gas flows from the absorber to the pocket about an annular space surrounding the sleeve. The sleeve is spaced a slight distance from the lower end of the pocket to provide communication between the space within the sleeve and the annular space about the sleeve. With this arrangement liquid in the weak gas passage of the gas heat exchanger drains into the lower part of the pocket and can also flow into the lower part of the sleeve. The upper end of a conduit extends a short distance within the lower part of the sleeve, and, when the liquid reaches a definite level in the lower part of the sleeve, liquid overflows into the last-mentioned conduit which forms a part of the path of flow of rich gas from the evaporator to the absorber. In this manner liquid is effectively removed from the weak gas passage of the horizontal gas heat exchanger and caused to flow to the absorber in the path of flow of rich gas.

The invention, together with the above and other objects and advantages thereof, will be more fully understood upon reference to the following description and accompanying drawing forming a part of this specification, and of which the single figure more or less diagrammatically illustrates a refrigeration system embodying the invention.

In the drawing the present improvement is embodied in an absorption refrigeration system containing a pressure equalizing agent. Such a system includes a generator 10, condenser 11, a cooling unit 12 arranged in a thermally insulated storage space 14, and an absorber 15 which are inter-connected in a manner well known in the art and which will now be briefly described. The system contains a solution of refrigerant in absorption liquid, such as ammonia in water, for example, and also an auxiliary agent or inert gas, such as hydrogen.

The generator 10 is heated in any suitable manner, as by gas burner 16, for example, whereby refrigerant vapor is expelled from solution in generator 10. The expelled refrigerant vapor flows upwardly through a conduit 17 and an air-cooled rectifier 18 into the condenser 11 in which it is liquefied. Liquid refrigerant flows from condenser 11 through a conduit 19 into cooling element 12.

Liquid refrigerant evaporates and diffuses in cooling element 12 into inert gas which enters through a conduit 20. Due to evaporation of refrigerant fluid into inert gas a refrigerating effect is produced with consequent absorption of heat from the surroundings. The rich gas mixture of refrigerant vapor and inert gas formed in cooling element 12 flows from the upper part thereof through a conduit 21, a passage 22 of a horizontal gas heat exchanger 23 and conduit 24 into the lower part of absorber 15, as will be described presently.

In absorber 15 the rich gas mixture flows countercurrent to downwardly flowing absorption liquid which enters through a conduit 25. The absorption liquid absorbs refrigerant vapor from the inert gas, and inert gas weak in refrigerant flows from asorber 15 through a conduit 26, a chamber 27 formed by a jacket 28 enveloping the right-hand end of gas heat exchanger 23, a plurality of tubes 29 forming an inner passage of the gas heat exchanger 23, a chamber or space 30 at the left-hand end of the gas heat exchanger, and conduit 20 into the lower part of cooling element 12. The tubes 29 terminate in plates or headers 27a and 30a at the ends of gas heat exchanger 23.

The circulation of gas in the gas circuit just described is due to the difference in specific weight of the columns of gas rich and weak, respectively, in refrigerant vapor. Since the rich gas is heavier than the weak gas, a force is produced or developed within the system for causing flow of rich gas toward absorber 15 and flow of weak gas toward cooling element 12.

Absorption liquid enriched in refrigerant flows from the lower part of absorber 15 into a vessel 31, and thence through a conduit 32 and an inner passage of a liquid heat exchanger 33 into a coil 34 which is disposed about the lower end of a flue 35 extending upwardly through generator 10. Liquid is raised from coil 34 through a tube 36 into the upper part of generator 10 by vapor-liquid lift action. The refrigerant vapor expelled out of solution in generator 10, together with refrigerant vapor entering through tube 36, flows upwardly through conduit 17 and rectifier 18 into condenser 11, as explained above.

The absorption liquid from which refrigerant has been expelled flows from generator 10 through a conduit 37, outer passage of liquid heat exchanger 33, and conduit 25 into the upper part of absorber 15. The circulation of absorption liquid in the liquid circuit just described is effected by raising of liquid through tube 36. The heat liberated with absorption of refrigerant vapor in absorber 15 may be transferred to a cooling medium in any suitable manner. As shown, the absorber 15 is provided with a plurality of heat transfer fins 38 to transfer heat from the absorber to cooling air flowing over the surfaces of the latter and the heat transfer fins 38.

The lower end of condenser 11 is connected by a conduit 39, vessel 40, and conduit 41 to the gas circuit, as to the right-hand end of gas heat exchanger 23, for example, so that any inert gas which may pass through the condenser 11 can flow into the gas circuit. Refrigerant vapor not liquefied in the condenser flows through conduit 39 to displace inert gas in vessel 40 and force such gas through conduit 41 into the gas circuit. The effect of forcing gas into the gas circuit in this manner is to raise the total pressure in the entire system whereby an adequate condensing pressure is obtained to insure condensation of refrigerant vapor in condenser 11.

The slightly inclined horizontal gas heat exchanger 23 is disposed within the thermally insulated space 14, with the end thereof having the jacket 28 being disposed outside the space 14. By providing the jacket 28 atmospheric air is prevented from contacting a part of the system, which would otherwise be cold, to prevent water vapor contained in the surounding air from condensing on the outer surfaces of the gas heat exchanger 23. No condensate forms on jacket 28 because the inner surfaces thereof are contacted by warm gas flowing into chamber 27 from absorber 15.

A drain conduit 13 is provided to permit flow of unevaporated refrigerant from the lower part of cooling element 12 into the rich gas passage 23 of gas heat exchanger 22.

The relatively warm weak gas leaving the absorber 15 may contain vapor of absorption liquid, as stated above, and such vapor is condensed in the gas heat exchanger 23 due to cooling effected by rich gas flowing from the cooling element 12 to the absorber 15. In order to remove such condensate from the gas heat exchanger 23 the upper end of a pipe 42 is connected to the jacket 28 enveloping the right-hand end of gas heat exchanger 23. The pipe 42 extends vertically downward from the lower end of gas heat exchanger 23 and the lower part thereof is connected to conduit 26 into which flows weak gas leaving the absorber 15. The pipe 42 forms a pocket or auxiliary chamber within which is disposed a sleeve 43 which is connected at its upper end to the outer passage 22 of gas heat exchanger 23. The lower end of sleeve 43 terminates a short distance above the lower end of pipe 42 to provide communication between the lower end of sleeve 43 and the annular space about the latter. The upper end of conduit 24 extends a short distance within the lower end of sleeve 43.

During operation of the system, as described above, gas weak in refrigerant flows from absorber 15 to the lower part of cooling element 12. This gas, after leaving the absorber 15, flows through the conduit 26, the annular space about sleeve 43 within pipe 42, the space 27, the tubes 29 forming the inner passage of gas heat exchanger 23, space 30, and conduit 20 into the lower part of cooling element 12. The weak gas, which is relatively warm when it leaves the absorber 15, flows in heat exchange relation with rich gas which leaves the upper part of cooling element 12 through conduit 21, the space 22 of gas heat exchanger 23 which surrounds the tubes 29 and forms the outer passage of the gas heat exchanger, sleeve 43 and conduit 24 into the lower part of absorber 15. Liquid formed in gas heat exchanger 23, due to condensation of absorption liquid vapor accompanying the weak gas, flows downwardly in the tubes 29 into the space 27 and from the latter into the lower part of pipe 43. Liquid accumulating in the lower part of pipe 42 can flow into the lower part of sleeve 43 through the narrow annular slot formed between these parts, and such liquid effectively seals the path of flow of weak gas from the path of flow of the rich gas. Any liquid which enters the outer passage 22 of gas heat exchanger 23 through conduit 13 and does not evaporate in the gas heat exchanger also flows into the lower part of pipe 42 through the sleeve 43. When the liquid level in the lower part of sleeve 43 reaches the upper end of conduit 24, liquid overflows into the latter and flows with the rich gas toward the absorber 15.

Although a single embodiment of the invention has been shown and described, such variations and modifications are contemplated as fall within the true spirit and scope of the invention.

What is claimed is:

1. In an absorption refrigeration system having an evaporator, absorber, and a substantially horizontal gas heat exchanger connected to provide a circuit for circulation of gas, said gas heat exchanger providing paths of flow for two streams of gas flowing out of contact with each other, a member enveloping a part of said gas heat exchanger forming a portion of one of said paths and serving as a portion of the other of said paths structure associated with the lower part of said member and said horizontal gas heat exchanger constructed and arranged to form separated spaces each serving as a portion of one of said paths of flow and also provide a liquid drain from one space to the other space in which liquid accumulates to provide a liquid seal between the spaces.

2. In an absorption refrigeration system having an evaporator, absorber, and a substantially horizontal gas heat exchanger connected to provide a circuit for circulation of gas, structure extending downward from said horizontal gas heat exchanger including means forming a pocket and a sleeve within said pocket to form separated spaces in communication with each other, said structure being constructed and arranged to provide a liquid drain in the region of communication of said spaces in which liquid accumulates to form a liquid seal between the spaces.

3. In an absorption refrigeration system having a circuit for an inert gas including an evaporator, absorber, and a substantially horizontally inclined gas heat exchanger, said gas heat exchanger including a shell having end plates to provide end spaces and tubes connecting said end spaces and terminating at said end plates, said end spaces and tubes forming one passage for gas in said gas heat exchanger and the space between said end plates and surrounding said tubes forming another passage in said heat exchanger, structure connected to and extending downward from said shell constructed and arranged to form separated spaces, one of which is in communication with an end space and the other of which is in communication with the space between said end plates, and a liquid drain from one space to the other space in which liquid accumulates to provide a liquid seal between the spaces.

4. In an absorption refrigeration system having a circuit for an inert gas including an evaporator, absorber, and a substantially horizontally inclined gas heat exchanger having two passages through which gas flows in heat exchange relation, means connected to said gas heat exchanger providing an auxiliary chamber extending downward from said gas heat exchanger and in the lower part of which liquid may accumulate, means within said chamber to form a passage, said means being so constructed and arranged that the space within said passage is in open communication with the space formed by said chamber and surrounding said passage, the liquid accumulating in said chamber being effective to form a liquid seal between the spaces within and surrounding said passage and from which seal liquid can flow into said passage.

5. In an absorption refrigeration system having a circuit for an inert gas including an evaporator, absorber, and a substantially horizontally inclined gas heat exchanger having two passages through which gas flows in heat exchange relation, a pipe connected at one end to one of the passages in said gas heat exchanger and at the other end to receive gas from the absorber, a second pipe within said first pipe connected to the other passage in said gas heat exchanger and having the lower end thereof terminating a short distance above the lower end of said first pipe, and a third pipe extending upwardly within said second pipe and overlapping the latter to form a narrow annular passage between said second and third pipes, said first pipe and third pipes forming a channel to receive liquid and form a liquid seal between the space within said second pipe and space formed by said first and second pipes, and said third pipe being arranged to receive liquid from said channel.

6. In an absorption refrigeration system having a circuit for an inert gas including an evaporator, absorber, and a substantially horizontally inclined gas heat exchanger, said gas heat exchanger providing paths of flow for weak gas flowing from the absorber to the evaporator and for rich gas flowing from the evaporator to the absorber, a member enveloping a part of said gas heat exchanger forming a portion of said path for rich gas and serving as a portion of said path for weak gas, structure associated with said member and said gas heat exchanger and extending downwardly therefrom, said structure being constructed and arranged to collect liquid from weak gas flowing from the absorber to the evaporator and remove such liquid to rich gas flowing from the evaporator to the absorber, such liquid being removed from the weak gas to the rich gas through a liquid seal.

7. In an absorption refrigeration system having an evaporator, absorber, and a substantially horizontally inclined gas heat exchanger connected to provide a circuit for circulation of gas, said gas heat exchanger comprising a shell having a passage in which gas weak in refrigerant flows from the absorber to the evaporator and another passage in which gas rich in refrigerant flows from the evaporator to the absorber, structure connected to said shell and extending downward therefrom and including two annular-shaped members one disposed within the other to provide a first space in communication with said weak gas passage and a second space in communication with said rich gas passage, said structure being formed and arranged so that said spaces are in communication with each other to permit liquid to flow from said first space to said second space with such liquid forming a liquid seal between said spaces.

8. A refrigeration system as set forth in claim 7 including means whereby liquid accumulating to form the liquid seal flows in said circuit toward the absorber along with gas rich in refrigerant.

HARRY K. BERGHOLM.